United States Patent
Rao et al.

(10) Patent No.: US 8,531,985 B2
(45) Date of Patent: Sep. 10, 2013

(54) SYSTEM AND METHOD FOR CONFIGURATION AND MANAGEMENT OF QUEUE SETS

(75) Inventors: Prashant R. Rao, Oak Park, CA (US); Phil S. Ghang, Calabasas, CA (US); Ronald Francis Pardy, Thousand Oaks, CA (US); Lawrence S. Lavenberg, Los Angeles, CA (US)

(73) Assignee: Alcatel Lucent, Paris (FR)

( * ) Notice: Subject to any disclaimer, the term of this patent is extended or adjusted under 35 U.S.C. 154(b) by 220 days.

(21) Appl. No.: 13/192,676

(22) Filed: Jul. 28, 2011

(65) Prior Publication Data
US 2013/0028080 A1  Jan. 31, 2013

(51) Int. Cl.
*H04L 12/56* (2011.01)
*H04J 1/16* (2006.01)

(52) U.S. Cl.
USPC ............ 370/252; 370/278; 370/412; 370/419

(58) Field of Classification Search
USPC .................................. 370/278, 412, 419, 252
See application file for complete search history.

(56) References Cited

U.S. PATENT DOCUMENTS
2011/0122883 A1*  5/2011  Pacella et al. ................. 370/412

OTHER PUBLICATIONS
Cisco Systems, Inc.; Buffers, Queues, and Thresholds on the Catalyst 6500 Ethernet Modules; Aug. 2007; Cisco Whitepaper; pp. 1-9.

\* cited by examiner

*Primary Examiner* — John Pezzlo
(74) *Attorney, Agent, or Firm* — Garlick & Markison (57) ABSTRACT

A network device includes port interfaces and a traffic buffer configured with queue sets for buffering packets transmitted or received on the port interfaces. The network device also includes a management module that stores one or more queue set profiles. The queue set profiles specify configuration parameters for buffering and managing traffic in the queue sets. To configure a queue set, one of the queue set profiles is associated with the corresponding port interface and the configuration parameters are applied to the queue set. This queue set is then configured in accordance with the queue set profile. Management of port interfaces is thus performed by applying a queue set profile to similar groups of queue sets.

20 Claims, 9 Drawing Sheets

SYSTEM AND METHOD FOR CONFIGURATION AND MANAGEMENT OF QUEUE SETS

CROSS-REFERENCE TO RELATED PATENTS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communications and in particular to systems and methods for configuring and managing traffic buffers in a communications system.

2. Description of Related Art

Data networks, such as IP networks, Metro Ethernet or Enterprise Ethernet networks, support multiple applications including, for example, voice-over-IP (VoIP), data and video applications. Such data networks include interconnected network devices, commonly known as bridges, switches or routers, for routing the various types of voice, data and video traffic through the network.

A network device includes a plurality of external and internal ports that receive and transmit the various types of traffic. The external and/or internal ports in a network device often are assigned to a buffer that includes a queue group or set for each assigned port. To provide differing quality of service, each queue in a queue set is assigned to buffer a particular traffic class. A set of rules for prioritizing and processing the particular traffic class is then assigned to the different queues in the queue set. This set of rules defines how the different types of traffic in the queues in a queue set are processed by the network device.

Currently, the set of rules for each queue set must be individually configured by a network administrator. The administration and management of this configuration has to be performed for each queue set for each port in a network device. Since network devices may have hundreds of ports, applying and managing these configurations is tedious and increases the possibility of misconfiguring a network device.

Accordingly, there is a need for systems and methods for providing a more efficient method of configuring and managing queue sets in a network element.

SUMMARY

In an embodiment, a network device includes a plurality of port interfaces and at least one management module. The management module is operable to store a queue set profile, wherein the queue set profile defines a plurality of queue parameters; receive a first command to configure one or more of the plurality of port interfaces with the queue set profile; and configure a queue set for each of the one or more plurality of port interfaces in accordance with the queue set profile. In an embodiment, the management module is further operable to modify one of the queue parameters in the queue set profile in response to another command and reconfigure the queue sets with the modified queue parameter for each of the one or more plurality of port interfaces configured with the queue set profile.

In one or more of the embodiments, the management module further stores a plurality of admission control profiles each including a different admission control parameters and wherein one of the plurality of queue parameters of the queue set profile includes one of the plurality of admission control profiles.

In one or more of the embodiments, the management module is further operable to in response to another command, modify one of the plurality of admission control profiles included in the queue set profile; and reconfigure the queue sets in accordance with the modified one of the plurality of admission control profiles for each of the one or more plurality of port interfaces configured with the queue set profile.

In one or more of the embodiments, the one or more of the plurality of port interfaces in the first command includes a logical port having one or more physical port members and the management module is further operable to determine the one or more physical port members in the logical port and configure a queue set for each of the one or more physical port members in accordance with the queue set profile.

In one or more of the embodiments, the plurality of queue parameters includes one or more of the following types of parameters: admission control parameters, scheduling parameters, management parameters and physical buffer parameters.

In one or more of the embodiments, the queue set profile includes a plurality of queue parameters for each queue in the queue set.

In one or more of the embodiments, the network device includes a network interface module including the plurality of port interfaces and a queue module including a buffer that is configured with the queue set for each of the one or more plurality of port interfaces.

DETAILED DESCRIPTION

Figure 1:
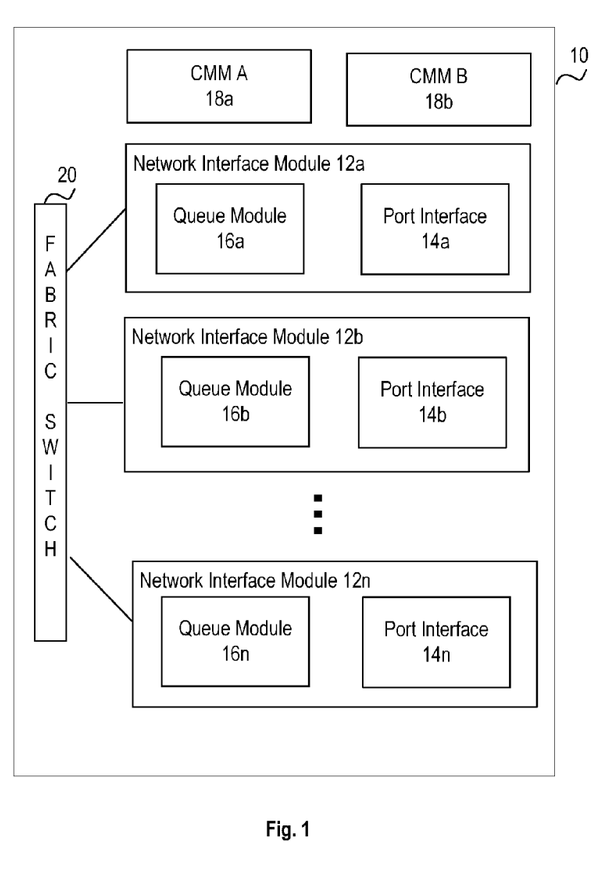
FIG. 1 illustrates a schematic block diagram of an embodiment of a network device in accordance with the present invention.

FIG. 1 illustrates a schematic block diagram of an embodiment of a network device 10. The network device 10 includes one or more Network Interface Modules 12a-n (NIMs), such as line cards or port modules, connected by a fabric switch module 20. The NIMs 12 include a port interface 14a-n and queue module 16a-n. For example, the network interface modules may include Ethernet (VLL, VPLS), IP/MPLS (IP VPN), legacy (ATM, SONET/SDH, POS), and/or mobile services. The port interfaces 14 of the NIMs 12 include a plurality of ports with similar or varying port speeds, connector types and features.

The network device 10 also includes at least one primary control management module 18a (CMM) and may also include a secondary CMM 18b that acts as a back-up or redundant module in case of failure of the primary CMM 18a. The CMM 18 provides automatic monitoring of the network element including error detection and status information, such as hardware and software status, link integrity, data flow, etc. The CMM 18 also provides one or more device interfaces, such as a console, USB and/or Ethernet management port connection to the network element for configuration and management of the network device by a network manager.

Though not shown in FIG. 1, the network device 10 may also include one or more additional fabric switch modules 20 to augment throughput or act as back-up or redundant fabric switches to the primary fabric switch module 20. In addition, the network device 10 may include power supplies, fan trays, status indicators, etc.

In an embodiment, packet data (Ethernet or IP) enters an ingress network interface module 12 through an ingress port interface 14. The ingress port interface 14 determines an egress network interface module 12 and transmits the packet to the ingress queue module for buffering (e.g., virtual output queue buffering). When the egress port is ready to transmit the packet, the packet is switched over the fabric switch 20 to the egress network interface module 12. The CMM 18 controls the traffic flow from the ingress NIM 12 to the egress NIM 12 to ensure quality of service and prevent congestion. In another embodiment, the egress NIM 12 buffers packets in egress queues in a queue module 16 while waiting to transmit the data packets from the egress port interface 14. In another embodiment, both the ingress NIM 12 and egress NIM 12 implement queue buffering for ingress and egress packets respectively. As such, the queue modules 16 may perform buffering for ingress and egress packets as forwarding decisions are made or as packets are waiting for transmission.

Without quality of service considerations, packets are stored in the buffers in the queue modules regardless of the type of traffic. For example, Voice over IP (VoIP) packets are stored in the same buffer or a buffer with similar traffic management as data packets. Furthermore, in the event of congestion (that is, a port buffer overflows), all traffic is equally subject to discard. Packets are processed in the buffers according to the order in which the packets were received or stored. When a buffer is full, subsequent packets are dropped in a first in, first out (FIFO) protocol.

To enable Quality of Service and traffic differentiation, the buffers are carved into multiple individual queues. Packets are assigned to one of the queues by packet type or class or priority or other type. The queues are configured with admission and scheduling parameters in consideration of the type of packets stored therein. For example, packets that are sensitive to jitter and delay variance, such as VoIP packets, are allocated to high priority queues while other less sensitive traffic is buffered in lower priority queues.

Figure 2:
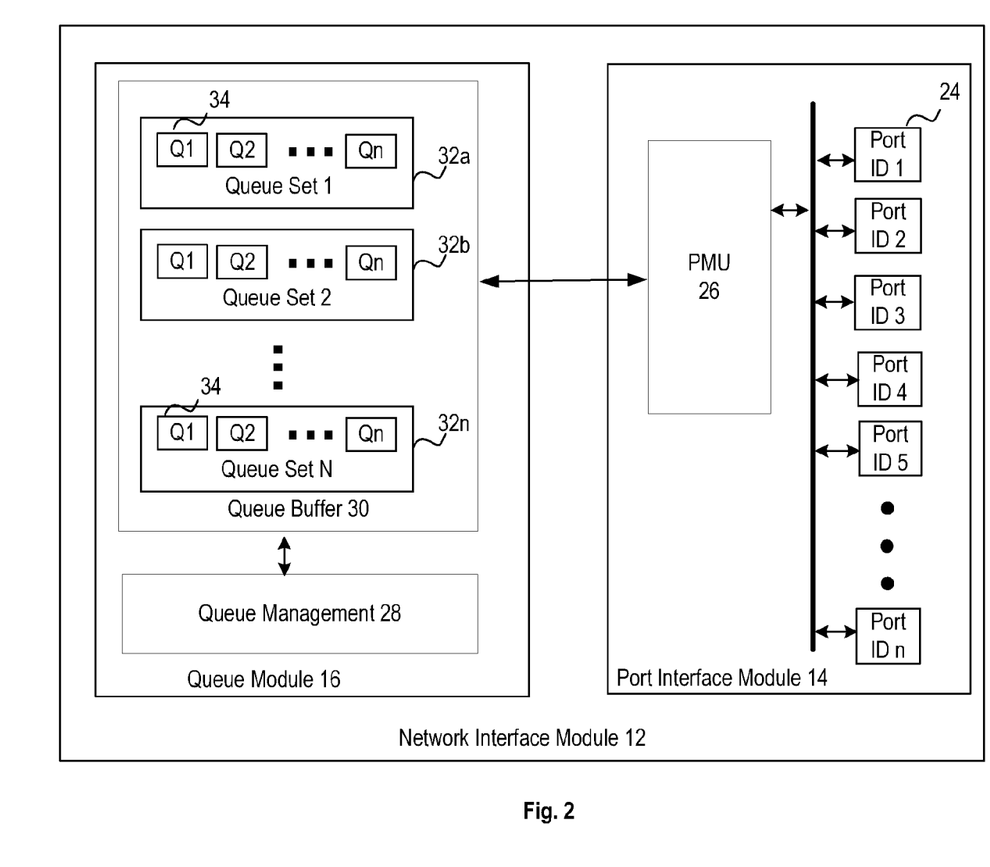
FIG. 2 illustrates a schematic block diagram of an embodiment of a network interface module in accordance with the present invention.

FIG. 2 illustrates a schematic block diagram of an embodiment of a network interface module (NIM) 12 in more detail. The port interface module 14 includes a plurality of port interfaces 24 that are connected to external network devices, such as customer devices, edge nodes, core network devices, etc. The external ports 24 may have the same physical interface type, such as copper ports (CAT-5E/CAT-6), multi-mode fiber ports (SX) or single-mode fiber ports (LX). In another embodiment, the external ports 24 may have one or more different physical interface types. A port interface 24 may include one or more member ports of a link aggregation group (LAG) or other trunk group, or a port interface 24 may include a virtual port that is identified by a traffic pattern, e.g. tunneled traffic. In an embodiment, the port interfaces 24 are each assigned an external port interface identification (Port ID), e.g., a device port value, such as a gport or dport value. In an embodiment, the Port ID of a port interface 24 is used to uniquely identify the port interface 24 of the network device.

The port interface module 14 further includes a packet management unit (PMU) 26 that processes ingress and egress packets. The packets may be switched to another port interface 24 of the Port Interface Module 14 or to the Queue Module 16 for buffering prior to transmission to another NIM 12.

The Queue Module 16 includes a queue management module 28 and queue buffer 30. The queue management module 28 provides buffer and traffic management. Though the port interface module 14 and queue module 16 are illustrated as separate modules, one or more functions or components of the modules may be included on the other module or combined into an alternate module or otherwise be implemented in one or more integrated circuits.

In an embodiment, the queue buffer 30 is logically or physically separated into one or more queue sets 32a-n. Each queue set 32 includes a plurality of queues 34. A queue set 32 provides buffering for packets associated with a port interface 24. The queue set 32 may be designated as buffering for ingress packets or for egress packets for the port interface 24. In addition, a queue set 32 may be designated for multicast or for unicast traffic.

In an embodiment, each queue set 32 is configured in accordance with a predefined queue set profile. The queue set profile includes configuration parameters for quality of service (QoS) admission control and bandwidth management. To configure a queue set 32, a queue set profile is selected for one or more port interfaces 24. A queue set 32 is then created for each identified port interface 24 having the configuration parameters defined in the selected queue set profile. The same queue set profile may be identified for a plurality of port interfaces 24. The queue sets 32 for each of the identified plurality of port interfaces 24 will then have a unified behavior for admission control and queue scheduling along with a set of common management configuration.

In operation, the PMU 26 receives an ingress packet from a port interface 24. The PMU 26 determines a packet class or type and transmits the packet to the queue buffer 30 to a queue set 32 associated with the port interface 24. The packet is stored in one of the queues 34 of the queue set 32 based on the packet class or type or priority. For example, in an embodiment for Ethernet traffic, packets are buffered in a queue 34 of a queue set 32 based on a traffic class designated by a COS value associated with the frame. The queue set profile defines which traffic classes are assigned to a queue 34 in a queue set 32 and the admission control and scheduling parameters for each queue 34 in the queue set 32.

Figure 3:
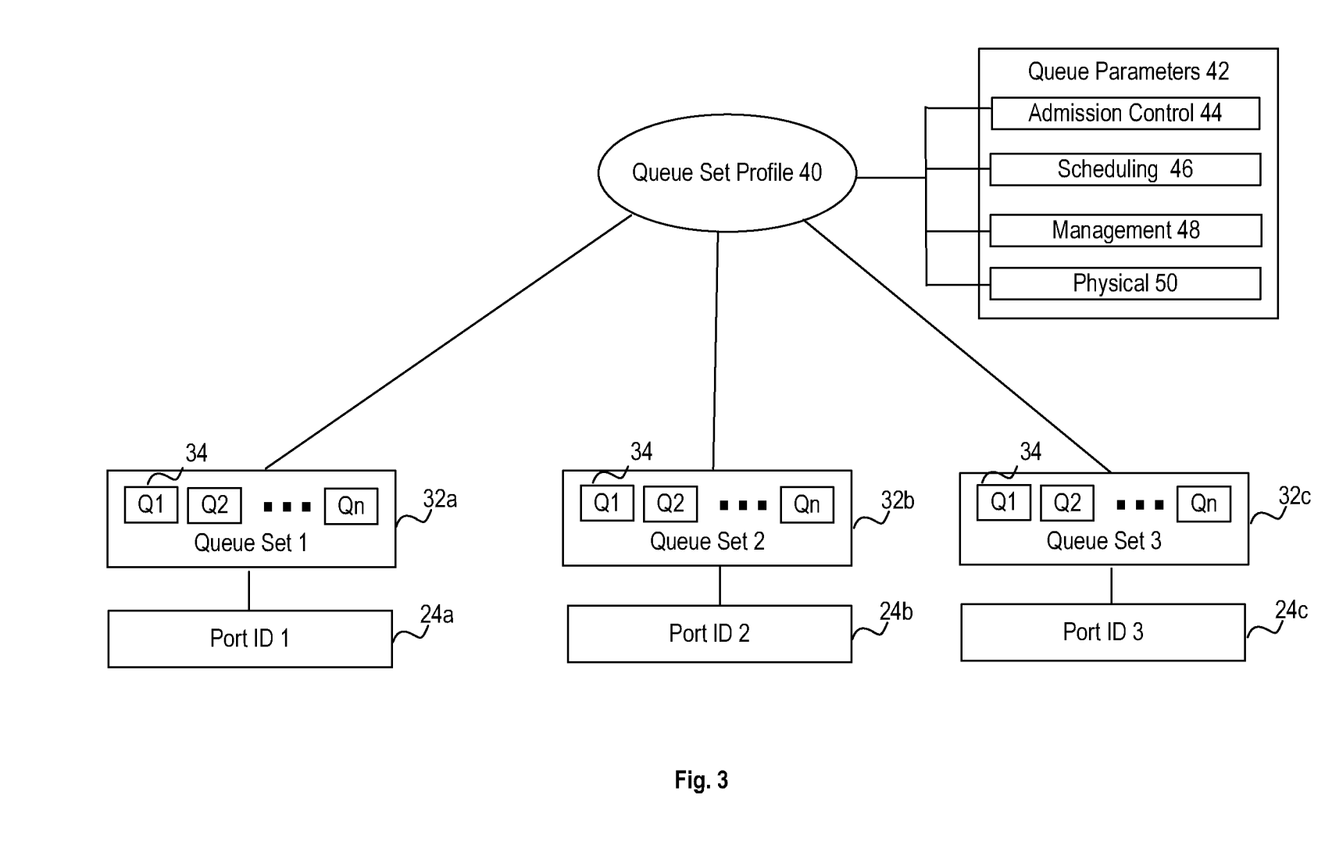
FIG. 3 illustrate a schematic block diagram of an embodiment of a queue set profile in accordance with the present invention.

FIG. 3 illustrates a logical diagram of an embodiment of a queue set profile 40. In this embodiment, the queue set profile 40 has been associated with a plurality of port interfaces 24*a-c*. A queue set 32*a-c* has been defined for each port interface 24*a-c* in accordance with the queue set profile 40. The queue set profile 40 is a logical entity with a predefined queue set configuration. When a port interface 24 is associated with the queue set profile 40, the logical configuration of the queue set profile 40 is instantiated or applied to the actual physical queue set 32 of the port interface 24.

The queue set profile 40 defines various configuration or queue parameters 42 for a queue set 32. The queue parameters 42 include one or more configurable parameters for managing traffic through a queue set 32. In an embodiment, the queue parameters 42 include, inter alia, one or more of admission control parameters 44, scheduling parameters 46, management parameters 48 and physical parameters 50. For example, in an embodiment the physical parameters 50 include the number and buffer size of queues 34 in a queue set 32. The number of queues 34 for example may be one, two, four, eight or more queues while the buffer size may include an absolute or relative buffer size for the queue set 32 and absolute or relative size of each queue 34 with respect to the queue set buffer size. The management parameters 48 include enable/disable statics collection, enable/disable admission control, enable/disable a queue, or other management type parameters. The scheduling parameters 46 include type of scheduling algorithm (such as strict priority, weighted fair queuing, best effort, assured forwarding, expedited forwarding, etc.) for each queue 34. The admission control parameters include weighted random early detection (WRED) parameters (min/max thresholds), tail drop thresholds, traffic class or classes, type of service, differentiated serving (DSCP) type, etc., for each queue 34.

In an embodiment, the queue set profile 40 is implemented for layer 2 (L2) and layer 3 (L3) based traffic on switches/routers where packet flows are classified into one or more priorities or traffic classes. This classification provides the ability to prioritize traffic based on an end user or application requirements. The queue set profile 40 defines classification of traffic buffered in queues 34 in the queue set 32. For example, the queue set profile 40 specifies one or more traffic classes to be buffered by each queue 34 in the queue set 32. The prioritization for handling this buffered traffic in each queue 34 is also provided by queue set profile 40. This prioritization may include admission control 44 and scheduling 46 queue parameters for the queue set 32.

The queue set profile 40 provides the ability to configure similar groups of queue sets 32. Examples of similar groups of queue sets 32 are network facing ports and user facing ports. For example, a queue set profile 40 can be defined to incorporate the Service Level Agreement (SLA) between a customer and a service provider. The queue set profile 40 is then applied to the physical queue set 32 for each port interface 24 coupled to the nodes of that customer. In addition, a queue set profile 40 provides a network administrator the flexibility to control and affect network behavior or SLA changes over a range of customer ports. The network administrator by modifying one or more parameters in a queue set profile 40 has the ability to reconfigure parameters across multiple ports and queue sets which share the same SLA. This centralized control of queue set behavior provides advantages to network management especially with large network deployments. Managing the queue set behavior for a group of network interfaces sharing the same queue set profile 40 simplifies the configuration and reduces the possibility of misconfiguring any one network interface. It provides efficient management of queue sets 32 of a network device 10 and improves the reliability of network devices and also helps to ease the complexity of maintaining network configuration.

Figure 4:
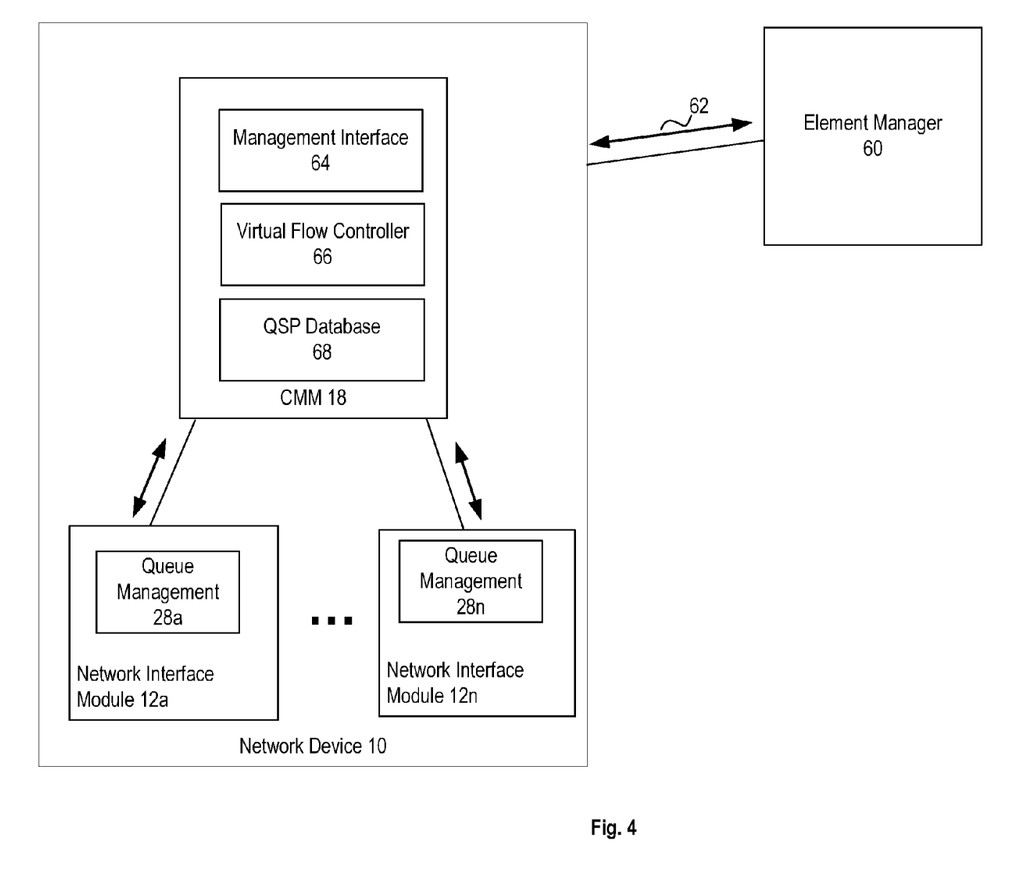
FIG. 4 illustrates a schematic block diagram of an embodiment of a system for configuring a network device with a queue set profile in accordance with the present invention.

FIG. 4 illustrates a schematic block diagram of an embodiment of a system for configuring a network device 10 with a queue set profile 40. The CMM 18 of the network device 10 includes a management interface 64, virtual flow controller 66 and QSP database 68. The management interface 64 is coupled to an element manager 60 over connection 62. The management interface 64 includes, for example, a serial port, USB or Ethernet port interface. Though shown as part of the CMM 18, the NIMs 12 may also include a management interface 64 to communicate with the element manager 60. The connection 62 includes a local (wire line or wireless) point to point connection from the element manager 60 to the management interface 64. In another embodiment, the connection 62 includes a remote connection over a LAN, WLAN or WAN to the network device 10. The element manager 60 may be a portable computing device (e.g., a laptop computer, handheld computer, tablet computer, cell phone, smart phone, personal digital assistant and/or any other portable device that includes a computing core) and/or a fixed computing device (e.g., a personal computer, a computer server and/or any type of computing equipment that includes a computing core). The element manager 60 implements a management communication protocol, such as command line interface (CLI) or simple network management protocol (SNMP), for configuration and management of the network device 10 with a text or graphic interface.

In an embodiment, the Virtual Flow Controller (VFC) 66 is the main network device module that manages the traffic flow through the network device 10. The VFC 66 communicates with the queue management 28*a-n* in the NIMs 12 to create and manage the queue sets 32, applying the queue parameters 42 as defined in the associated queue set profiles 40. In an embodiment, configuration of the queue sets 32 is performed in response to management commands from the element manager, e.g. use of CLI or SNMP or other type of management commands.

The QSP database 68 stores one or more queue set profiles 40. In an embodiment, the QSP database 68 includes a default queue set profile 40. In an embodiment, when QoS is activated for a network device, each port interface 24 of the network device is associated with the default queue set profile 40. To reassign a port interface 24 with a different queue set profile 40, a network administrator enters at least one instruction or command at the element manager that identifies at least one port interface 24 and a queue set profile 40. In response to the command from the element manager 60, the CMM 18 reassigns the indicated port interface 24 to the identified queue set profile 40. The command may include a single command line or include multiple command lines. For example, a CLI command may include a command type (such as Quality of Service command type), a command (such as apply a QSP or modify or edit a QSP, etc.), an identification of a queue set profile 40 and an identification of one or more port interfaces. Alternatively, an element manager 60 may include a graphical user interface in which a menu includes a list of queue set profiles 40 to select from. A graphical representation of the network device may also be provided in which a user selects one or more port interfaces, a slot/NIM or the entire network device to apply the selected queue set profile 40. The CMM 18 receives the command from the element manager and applies the queue set profile to the identified one or more port interfaces.

To reassign a queue set profile 40, the command may identify a single port interface 24 by a port ID, a plurality of port interfaces 24 by port IDs, a NIM 12 by slot or module ID or an aggregate link by linkagg ID. When a plurality of port IDs are identified, each identified port interface 24 is associated with the indicated queue set profile 40. When a NIM 12 is identified (e.g. by slot or module ID), each port interface 24 on the identified NIM 12 is associated with the indicated queue set profile 40. When an aggregate link is identified, each port interface 24 in the link aggregate is associated with the indicated queue set profile 40.

In addition to reassigning a queue set profile 40, in an embodiment, new queue set profiles 40 may be created and existing queue set profiles 40 may be modified. When a queue set profile 40 is modified, the CMM 18 updates the queue set profile 40 stored in the QSP database 68. The CMM 18 determines each port interface 24 associated with the modified queue set profile 40 and reconfigures such determined port interfaces 24 with the modified queue set profile 40.

The CMM 18 in an embodiment also enables and/or disables collection of statistics for a queue set profile 40 or port interface 24. For port interfaces that belong to a link aggregation, statistics may be provided on per port basis, per NIM basis, per link aggregate basis or per QSP basis. For example, statistics on a per link aggregate basis combine and display the statistics of the port interfaces in the aggregate link, and statistics on a per queue set profile 40 basis combine and display the statistics of all the port interfaces associated with the queue set profile 40.

In an embodiment, the QSP database 68 may be pre-configured with the default queue set profile 40 and one or more other pre-defined queue set profiles 40 from which to select. In addition, a network administrator may create and store user-configured queue set profiles 40. Each queue set profile 40 includes an identifier, such as QSP1, QSP2, etc. The various parameters of a queue set profile 40 may be displayed by the element manager 60 as well as the port interfaces 24 associated with a queue set profile 40. Though CMM 18 is shown as including the QSP database 68, a NIM 12 may also store one or more of the queue set profiles 40. For example, the queue management module 28 may store queue set profiles 40 associated with queue sets 32 in the NIM 12. Alternatively, the queue management module 28 may store various queue set profiles 40 and directly communicate with the element manager 60 to configure queue sets 32 in the NIM 12.

Figure 5:
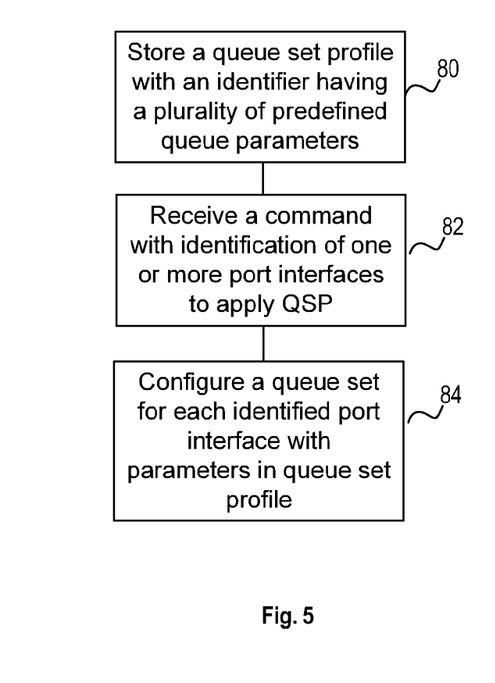
FIG. 5 illustrates a logical flow chart of an embodiment of a process for configuring a network device with a queue set profile in accordance with the present invention.

FIG. 5 illustrates a logical flow chart of an embodiment of a process for configuring a network device 10 with a queue set profile 40. In step 80, the CMM 18 or the queue management module 28 or both store a queue set profile 40 with its associated identifier and with a plurality of predefined queue parameters. In step 82, the CMM 18 or the queue management module 28 or combination thereof, receives an identification of one or more port interfaces to apply a queue set profile 40. The identification is included for example in a management command received from the element manager 60. The management command also includes an identification of a selected queue set profile 40. In step 84, the CMM 18 or the queue management module 28 or combination thereof, configures a queue set 32 for each identified port interface 24 with the plurality of parameters in the selected queue set profile 40.

Figure 6:
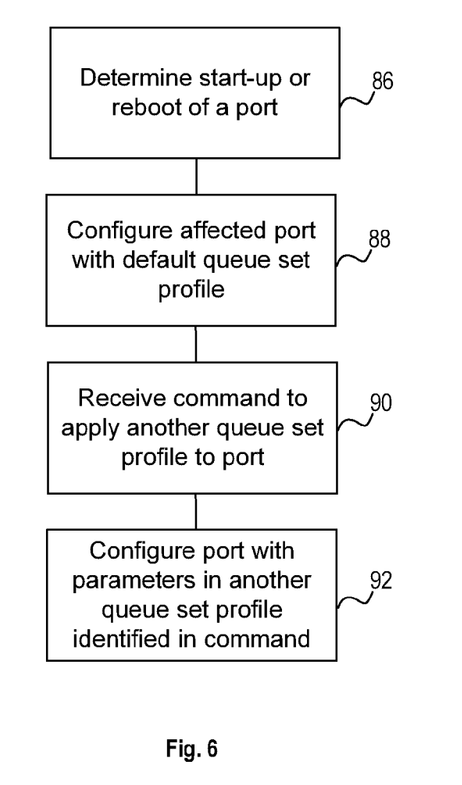
FIG. 6 illustrates a logical flow chart of an embodiment of another process for configuring a network device with a queue set profile in accordance with the present invention.

FIG. 6 illustrates a logical flow chart of an embodiment of another process for configuring a network device with a queue set profile 40 in accordance with the present invention. In step 86, the network device 10 or a NIM 12 or a port interface 24 in a NIM 12 is installed or re-booted or re-loaded. In response thereto, in step 88, a default queue set profile 40 is applied to the affected port interfaces 24 of the reloaded network device 10 or NIM 12. In step 90, the CMM 18 or the queue management module 28 or combination thereof, receives a command to reconfigure the affected port interface with another queue set profile 40. In step 92, the CMM 18 or the queue management module 28 or combination thereof, reconfigures a queue set 32 for each identified port interface 24 with the plurality of parameters in the queue set profile 40.

Figure 7:
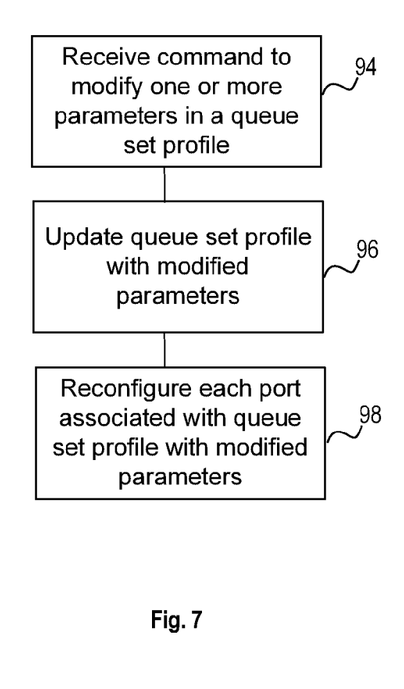
FIG. 7 illustrates a logical flow chart of an embodiment of a process for modifying a queue set profile in accordance with the present invention.

FIG. 7 illustrates a logical flow chart of an embodiment of a process for modifying a queue set profile 40 in accordance with the present invention. In step 94, the CMM 18 or the queue management module 28 receives a command to modify or alter one or more of the plurality of parameters in a queue set profile 40. In step 96, the CMM 18 modifies the parameters for the queue set profile 40 and stores the modified parameters for the queue set profile 40 in the QSP database 68. In step 98, the CMM 18 or the queue management module 28 or combination thereof, determines each port interface 24 associated with the queue set profile 40 and reconfigures the queue set 32 for each determined port interface 24 with the modified parameters of the queue set profile 40.

Figure 8:
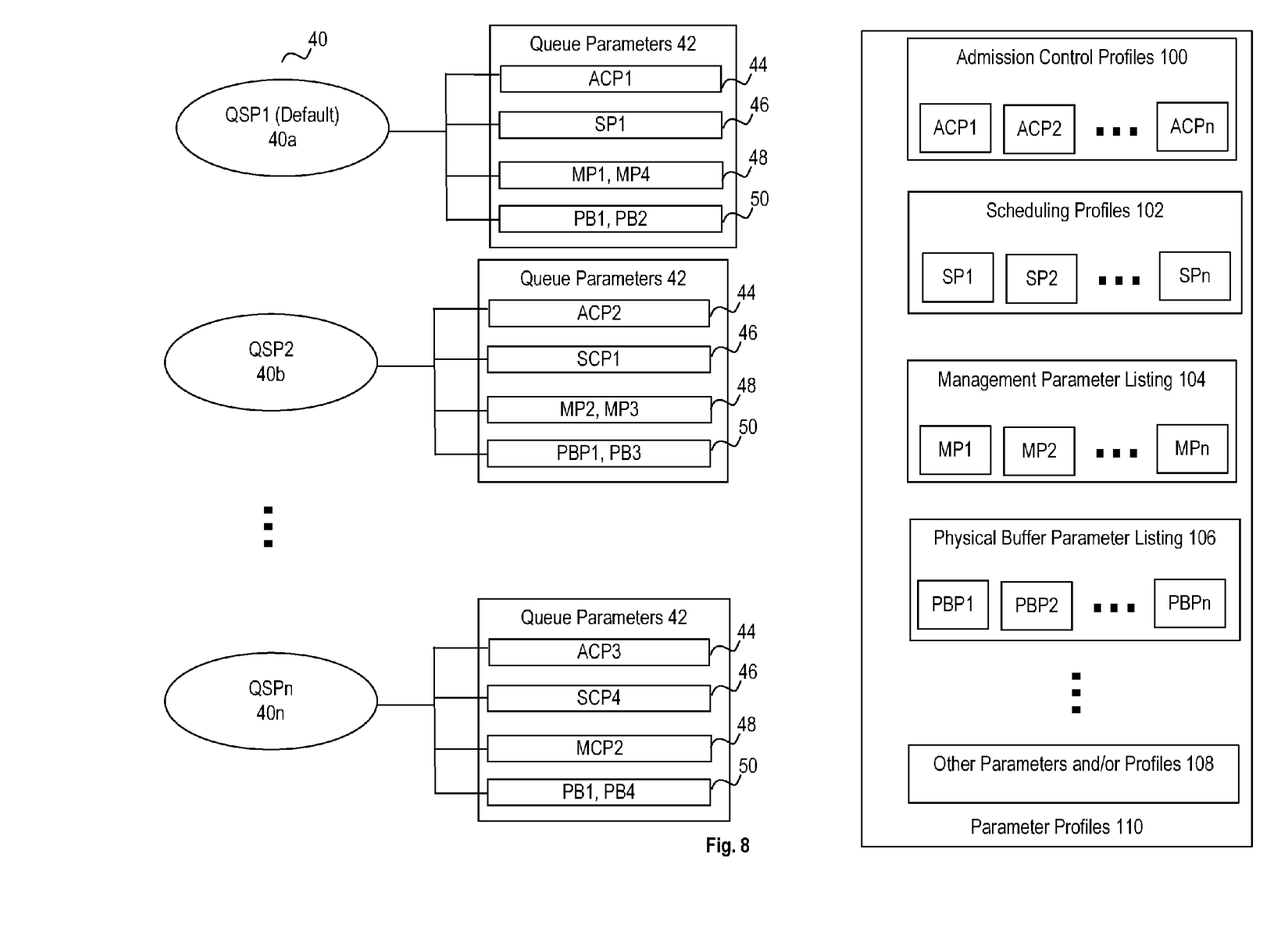
FIG. 8 illustrates a schematic block diagram of an embodiment of queue set profiles in accordance with the present invention.

FIG. 8 illustrates a schematic block diagram of an embodiment of example queue set profiles 40a-n. Each queue set profile 40 is assigned a queue set profile identification, such as QSP1, QSP2, etc., and includes a plurality of queue parameters 42. The queue parameters 42 include one or more configurable parameters associated with a queue set 32. In an embodiment, the queue parameters 42 include, inter alia, one or more of admission control parameters 44, scheduling parameters 46, management parameters 48 and physical parameters 50.

In an embodiment, one or more of the queue parameters 42 may be specified in predefined parameter profiles 110. For example, pre-defined parameter profiles 110 for admission control policies are each stored in an admission control profile (ACP) 100. In an embodiment, an admission control profile 100 pre-defines, for example, a Weighted Random Early Detection (WRED) policy and pre-defines various WRED parameters, such as Minimum queue length threshold, Maximum queue length threshold, Drop Probability and Queue Gain. Another admission control profile may also specify a Weighted Random Early Detection (WRED) policy but pre-defines the various WRED parameters with different values.

In an embodiment, another admission control profile 100 pre-defines a tail drop threshold policy and pre-defines various tail drop thresholds. For example, an ACP 100 may pre-define a tail drop threshold of 60% for queue 1 of a queue set 32 and 70% for queue 2. When selected for a queue set profile 40, the ACP 100 is applied to the associated queue sets 32 such that queue 1 has a tail drop threshold of 60% and packets in that queue are dropped until the queue is less than 60% full while queue 2 has a tail drop threshold of 70% and packets in that queue are dropped until the queue is less than 70% full. Other admission control policies and associated parameters/thresholds may be defined in an admission control profile 100.

In an embodiment, an admission control profile 100 is associated with a queue set profile 40 to define an admission control policy. The admission control profile 100 is then applied to each queue set 32 associated with the queue set profile 40. To change an admission control profile 100, a command is sent to the CMM 18 to modify the ACP 100. In response, the CMM 18 modifies the ACP 100 and determines the queue set profiles 40 associated with the modified ACP 100. The CMM 18 then auto-configures the queue sets 32 associated with the determined queue set profiles 40 with the modified ACP 100.

Similarly, to the ACP 100, in an embodiment, pre-defined parameter profiles 110 for scheduling algorithms are each stored in a scheduling profile (SP) 102. Each scheduling profile 102 pre-defines one or more scheduling algorithms (such as strict priority, weighted fair queuing, best effort, assured forwarding, expedited forwarding, differentiated servicing, etc.) and any associated parameters for each queue 34 in a queue set 32. The scheduling profile 102 may also designate the traffic classes of packets mapped to each queue 34 in the queue set 32 or other criteria for defining which packets are buffered in each queue 34. In another embodiment, scheduling algorithms and parameters may be supported but not grouped in scheduling profiles 102.

The management parameter listing 104 defines various management parameters 48, such as enable/disable statics collection, enable/disable admission control, enable/disable a queue 34, or other management type parameters. In an embodiment, one or more management parameters 48 and associated values may be grouped into a management profile as well.

The physical buffer parameter listing 106 predefines physical parameters 50 associated with a queue set 32, such as number of queues 34 in a queue set 32 and buffer size of queues 34 in a queue set 32. In another embodiment, the physical buffer parameters may be pre-determined, e.g. each queue set 32 includes 2, 4 or 8 queues and has a queue size based on active interfaces in the system. Other types of parameters and/or profiles 108 may also be included in a queue set profile 40.

Figure 9:
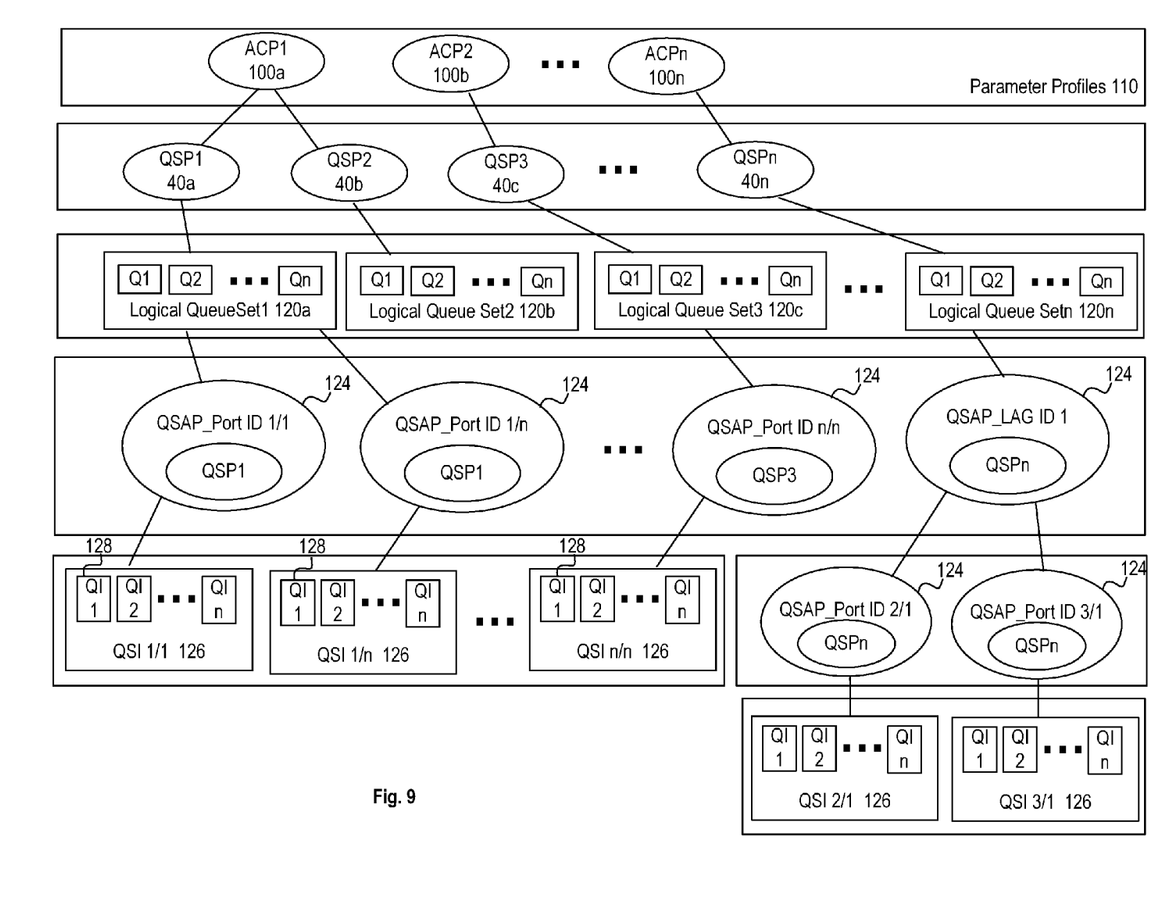
FIG. 9 illustrates a schematic block diagram of an embodiment of a logical representation of configuration of queue set profiles in accordance with the present invention.

FIG. 9 illustrates a schematic block diagram of an embodiment of a logical representation of configuration of queue set profiles 40. A queue set profile 40 is a logical entity. It consists of a logical queue set 120*a-n* upon which the desired queue set configuration from the queue set profile (QSP) 40 is applied. An admission control profile 100*a-n* is associated with each queue set profile 40 to provide admission control. In an embodiment, one of the admission control profiles 100*a-n* serves as the default admission control profile and is automatically assigned to each queue set profile 40 until reconfigured. Though only admission control profiles 100*a-n* are shown in FIG. 9, other profiles and parameters are similarly represented as logical entities associated with a queue set profile 40.

When a port interface 24 is associated with a queue set profile 40, the queue set profile 40 is said to be instantiated for this port interface 24. The logical configuration of the queue set profile 40 is applied on the actual physical queue set 32 for the port interface 24. A queue set instance (QSI) 126 is a logical entity that refers to the physical queue set 32 for a port interface 24. The QSI 126 includes one or more queue instances (QI) 128 that each represents a queue 34 in the queue set 32. The queue set profile 40 associated with each QSI 126 defines the output scheduling behavior for the physical queue set 32 associated with the QSI 126. In an embodiment, one of the queue set profiles 40 (such as QSP 1 40*a*) serves as a default queue set profile 40 that is automatically assigned to each QSI 126. The queue set attachment point (QSAP) 124 is a logical entity generated to identify the association or instantiation of a QSI 126. In an embodiment, only one QSI 126 per QSAP 124 is supported. For example, when a QSAP 124 is generated for a logical port, such as LAG ID1, a QSAP 124 is generated for each port interface 24 that is a member of the LAG ID1. Similarly, when a QSAP 124 with applied queue set profile 40 is requested for a NIM 12 or service level agreement (SLA) or customer, a QSAP 124 is generated for each port interface 24 associated with NIM 12 or service level agreement (SLA) or customer and the queue set profile 40 applied to the QSIs 126 for such port interfaces 24.

In an embodiment, each physical port and logical (LAG) or virtual port interface 24 is allocated a QSAP 124 upon start up or reboot. A default QSI 126 with an applied default queue set profile 40 is allocated to each port interface 24. A QSI 126 can then be associated with a different queue set profile 40. When a port interface 24 is added to a logical port (such as LAG), the queue set profile 40 of the logical port is applied to the port interface 24. When a port interface 24 leaves a logical port, then the default queue set profile 40 is applied to the port interface 24. In an embodiment, a queue set profile 40 can be disabled affecting the QSIs 126 that are attached to it. A QSI 126 can be disabled, affecting only queue instances 128 within that QSI 126. A logical queue within a queue set profile 40 can be disabled, affecting all corresponding queue instances 128 in QSIs 126 associated with the queue set profile 40. A queue instance 128 within a QSI 126 may be disabled, affecting only that queue instance 128. A QSAP 124 may be enabled or disabled, enabling or disabling all the QSIs 126 associated with that QSAP 124. In addition, a queue set profile 40 can be disabled, affecting all the QSIs 126 associated with it. A queue set profile 40 can be modified or replaced, affecting all the QSIs 126 associated with it. The queue set profile 40 associated with a QSAP 124 can be changed, affecting all the QSIs 126 associated with that QSAP 124.

In an embodiment, a parameter profile 110, such as ACP 100, can be globally enabled, disabled or modified, affecting the QSPs 40, QSIs 126 and queue instances 128 that use that profile or queue parameter. A queue parameter 42 or parameter profile 110 in a queue set profile 40 can be enabled, disabled or modified, affecting the queue instances 128 in the QSIs 126 associated with that QSP. A queue parameter 42 or parameter profile 110 within a QSI 126 can be enabled, disabled or modified, affecting only the queue instances 128 in that QSI 126. A queue parameter 42 or parameter profile 110 for a queue instance 128 can be enabled, disabled or modified, affecting only that queue instance 128.

By modifying one or more queue parameters 42, a parameter profile 110, QSP 40, QSAP 124, or QSI 126, a network administrator has the ability to reconfigure parameters across multiple port interfaces 24. This centralized control of the queue set behavior provides advantages to network management especially with large network deployments. Managing the queue set behavior for a group of port interfaces 24 sharing the same queue set profile 40 simplifies the configuration and reduces the possibility of misconfiguring any one network interface. It provides efficient management of queue sets 32 of a network device 10 and improves the reliability of network devices and also helps to ease the complexity of maintaining network configuration.

Figure 10:
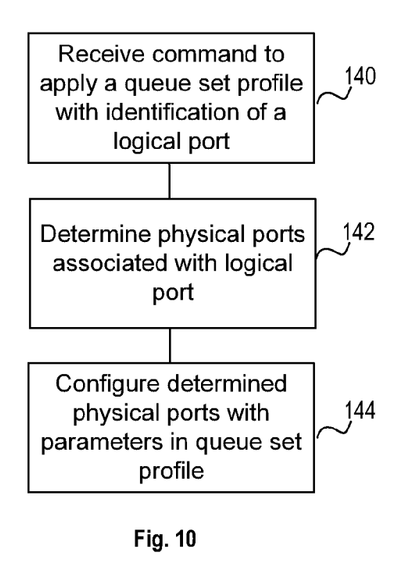
FIG. 10 illustrates a logical flow chart of an embodiment of a process for configuring a logical port with a queue set profile in accordance with the present invention.

FIG. 10 illustrates a logical flow chart of an embodiment of a process for configuring a logical port with a queue set profile 40. In step 140, the CMM 18 or the queue management module 28 receives a command to apply a queue set profile 40 and an identification of a logical port. In step 142, the CMM 18 or the queue management module 28 determines one or more physical port interfaces 24 that are associated with the logical port. For example, if the logical port is a link aggregation group (LAG), a LAG ID is provided. A table or database in the CMM 18 and/or NIM 12 includes an identifier of the physical port interfaces 24 that are members of the LAG. In step 144, the CMM 18 or the queue management module 28 configures the determined physical port interfaces 24 with the parameters in the queue set profile 40. As discussed with respect to FIG. 9, a QSAP 124 with applied queue set profile 40 is associated with each of the QSIs 126 for the port interfaces 24.

Figure 11:
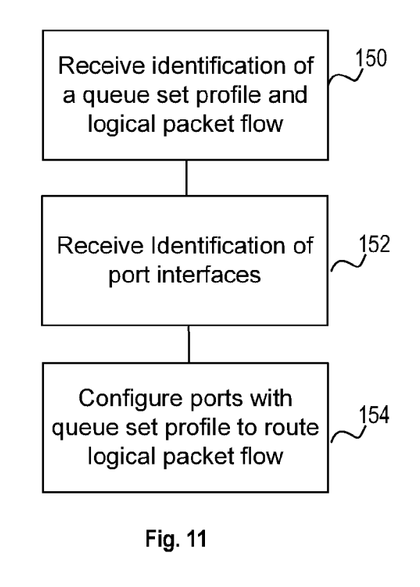
FIG. 11 illustrates a logical flow chart of an embodiment of a process for configuring a logical packet flow with a queue set profile in accordance with the present invention.

FIG. 11 illustrates a logical flow chart of an embodiment of a process for configuring a logical packet flow with a queue set profile 40. In step 150, the CMM 18 or the queue management module 28 receives a command to apply a queue set profile 40 and an identification of a logical packet flow. A packet flow includes, e.g., a sequence of packets between a source and destination. Packets in a packet flow may be defined to share one or more of the following values: source internet protocol (IP) address, Destination IP address, source port, destination port, type of service, etc. In addition, in step 152, the CMM 18 or the queue management module 28 receives an identification of a physical port interface 24 or NIM 12 or logical port. If none is received, the queue set profile 40 may be applied to a default set of ports or all the ports of a NIM 12 or network device 10. The queue set profile 40 designates one or more queues and queue parameters for buffering the packet flow. In step 154, the queue set profile 40 is applied to the designated port interfaces 24 to configure queue sets 32 to buffer the packet flow.

Figure 12:
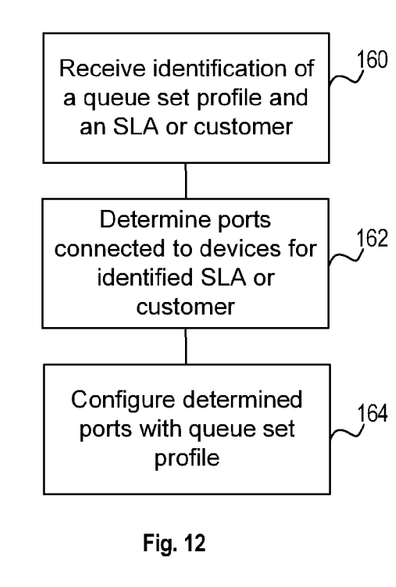
FIG. 12 illustrates a logical flow chart of an embodiment of a process for configuring customer ports with a queue set profile in accordance with the present invention.

FIG. 12 illustrates a logical flow chart of an embodiment of a process for configuring customer ports with a queue set profile 40. In step 160, the CMM 18 or the queue management module 28 receives a command to apply a queue set profile 40 and an identification of a service level agreement (SLA) or customer. For example, one or more queue set profiles 40 are designed to fulfill a customer SLA. The queue set profile 40 is then applied to port interfaces 24 coupled to the customer nodes. A different queue set profile 40 may be designed to fulfill each different level of customer SLAs. As customers are activated at an SLA level, port interfaces 24 to the customers can be quickly configured with the designed queue set profile 40 for that customer's SLA level. To modify performance at an SLA level, the queue set profile 40 designed for the SLA level is modified and customer ports are automatically updated. In step 162, the CMM 18 or the queue management module 28 determines port interfaces 24 (physical and/or logical) that are coupled to the nodes of the identified customer or that require the identified SLA. The determined port interfaces 24 are then configured with the queue set profile 40 in step 164.

Figure 13:
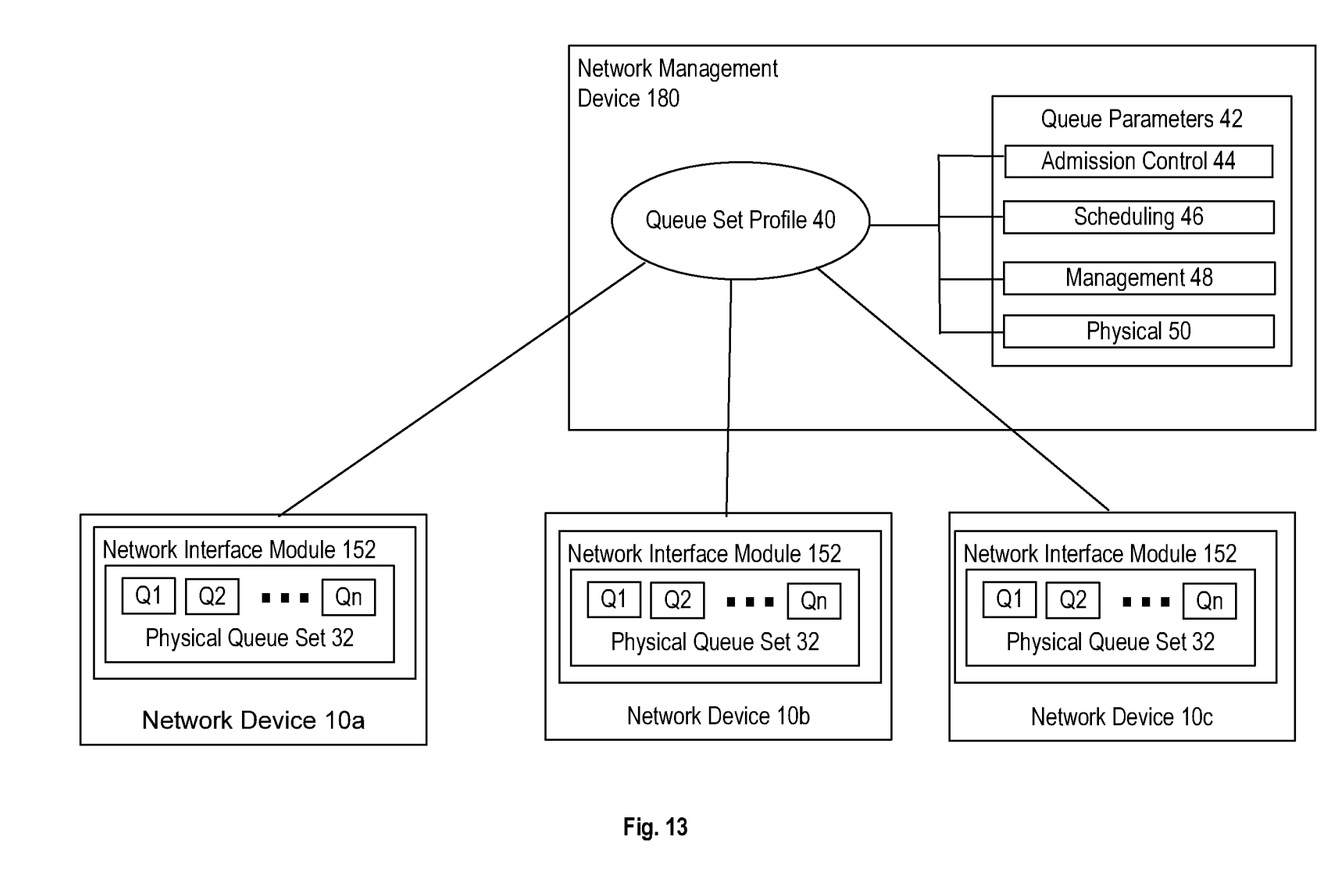
FIG. 13 illustrates a schematic block diagram of an embodiment of a system for configuring queue set profiles across a plurality of network devices in accordance with the present invention.

FIG. 13 illustrates a schematic block diagram of an embodiment of a system for configuring queue set profiles 40 across a plurality of network devices 10a-c. In an embodiment, a network management device 180 communicates with a plurality of network devices 10. In an embodiment, the network management device 180 is operable to configure port interfaces 24 on each of the plurality of network devices with one or more queue set profiles 40. The queue set profiles 40 include configuration parameters for QoS admission control and bandwidth management. For example, a queue set profile 40 is selected for at least one port interface on each of the plurality of devices. The network device 10 receives a command from the network management device 180 with the queue set profile 40 and port interface identification. A queue set 32 is then created for each identified port interface 24 having the configuration parameters defined in the queue set profile 40. The queue sets 32 for each of the identified plurality of port interfaces 24 across the network devices will then have a unified behavior for admission control and queue scheduling along with a set of common management configuration.

Though network devices 10 are described herein, any type of computing device may implement the configuration and management of queue sets 32 with queue set profiles 40 as described herein. For example, any type of device with configurable queue sets 32 may implement the described queue set profiles 40, such as a laptop computer, handheld computer, tablet computer, cell phone, smart phone, personal digital assistant, a personal computer, a computer server and/or any type of computing device that includes a computing core.

The various modules described herein, such as network interface module 12, port interface 14, queue module 16 and control management module 18, may be implemented to include one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The various modules may be implemented to include a memory that is an internal memory or an external memory, and the memory may be a single memory device or a plurality of memory devices. The memory may be a read-only memory, random access memory, volatile memory, non-volatile memory, static memory, dynamic memory, flash memory, cache memory, and/or any device that stores digital information. The various modules may implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The various modules may execute hard-coded and/or software and/or operational instructions stored by the memory to perform the steps and/or functions described herein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A network device, comprising:
    a plurality of port interfaces; and
    at least one management module operable to:
        store a queue set profile, wherein the queue set profile defines a plurality of queue parameters;
        receive a first command to configure one or more of the plurality of port interfaces with the queue set profile; and
        configure a queue set for each of the one or more plurality of port interfaces in accordance with the queue set profile.

2. The network device of claim 1, wherein the at least one management module is further operable to:
    in response to another command, modify one of the plurality of queue parameters in the queue set profile; and
    reconfigure the queue sets with the modified queue parameter for each of the one or more plurality of port interfaces configured with the queue set profile.

3. The network device of claim 1, wherein the management module further stores a plurality of admission control profiles each including a different plurality of admission control parameters and wherein one of the plurality of queue parameters of the queue set profile includes one of the plurality of admission control profiles.

4. The network device of claim 3, wherein the management module is further operable to:
    in response to another command, modify one of the plurality of admission control profiles included in the queue set profile; and
    reconfigure the queue sets in accordance with the modified one of the plurality of admission control profiles for each of the one or more plurality of port interfaces configured with the queue set profile.

5. The network device of claim 1, wherein the one or more of the plurality of port interfaces in the first command includes a logical port having one or more physical port members; and
    wherein the management module is further operable to determine the one or more physical port members in the logical port and configure a queue set for each of the one or more physical port members in accordance with the queue set profile.

6. The network device of claim 1, wherein the plurality of queue parameters includes one or more of the following types of parameters: admission control parameters, scheduling parameters, management parameters and physical buffer parameters.

7. The network device of claim 6, wherein the queue set profile includes a plurality of queue parameters for each queue in the queue set.

8. The network device of claim 1, further comprising:
    a network interface module including the plurality of port interfaces; and
    a queue module including a buffer that is configured with the queue set for each of the one or more plurality of port interfaces.

9. A method in a network device, comprising:
    storing a plurality of queue set profiles, wherein each of the queue set profiles defines a plurality of queue parameters;
    receiving a first command to configure a plurality of port interfaces, wherein the first command includes an identification of one of the plurality of queue set profiles; and
    configuring a queue set for each of the plurality of port interfaces in accordance with the identified queue set profile.

10. The method of claim 9, further comprising:
    receiving a second command to modify one of the plurality of queue parameters of the identified queue set profile;
    determining each of the plurality of port interfaces associated with the identified queue set profile; and
    reconfiguring the queue set for each of the plurality of port interfaces associated with the identified queue set profile with the modified queue parameter.

11. The method of claim 10, further comprising:
    storing a plurality of parameter profiles, wherein each parameter profile includes a plurality of admission control parameters;
    receiving a third command to modify one of the plurality of parameter profiles, wherein the third command includes an identification of one of the plurality of parameter profiles and a modified admission control parameter; and
    in response to the third command, modifying the identified parameter profile with the modified admission control parameter.

12. The method of claim 11,
    determining each of the plurality of queue set profiles associated with the identified parameter profile;
    determining each of the plurality of port interfaces associated with the determined queue set profiles; and
    reconfiguring the queue sets of the each of the plurality of port interfaces associated with the determined queue set profiles in accordance with the modified admission control parameter.

13. The method of claim 9, wherein one of the plurality of port interfaces in the first command includes a logical port having one or more physical port members.

14. The method of claim 13, further comprising:
determining the one or more physical port members in the logical port; and
configuring a queue set for each of the one or more physical port members in accordance with the identified queue set profile.

15. The method of claim 13, wherein the plurality of queue parameters includes one or more of the following types of parameters: admission control parameters, scheduling parameters, management parameters and physical buffer parameters.

16. A method for configuring port interfaces in a device, comprising:
storing at least one parameter profile;
storing at least one queue set profile that specifies a plurality of queue parameters, wherein one of the queue parameters includes the parameter profile;
receiving a configuration command, wherein the configuration command includes an identification of a plurality of port interfaces and the queue set profile;
associating the identified plurality of port interfaces with the queue set profile; and
configuring a queue set for each of the identified plurality of port interfaces with the plurality of queue parameters specified by the queue set profile.

17. The method of claim 16, further comprising:
receiving another configuration command to modify the parameter profile;
in response to the another configuration command, modifying the parameter profile;
determining the queue set profile that includes the modified parameter profile as one of the queue parameters;
determining the identified plurality of port interfaces associated with the queue set profile; and
configuring the queue set for each of the identified plurality of port interfaces with the modified parameter profile.

18. The method of claim 17, wherein the modified parameter profile includes a plurality of admission control parameters.

19. The method of claim 16, wherein one of the identified plurality of port interfaces includes a logical port having one or more physical port members.

20. The method of claim 19, further comprising:
determining the one or more physical port members in the logical port; and
configuring a queue set for each of the one or more physical port members in accordance with the queue set profile.

* * * * *